(12) United States Patent  
Ullman et al.

(10) Patent No.: US 7,854,131 B2  
(45) Date of Patent: Dec. 21, 2010

(54) THERMAL BUFFER SYSTEM

(75) Inventors: Alan Z. Ullman, Northridge, CA (US); Clyde D. Newman, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 451 days.

(21) Appl. No.: 12/104,300

(22) Filed: Apr. 16, 2008

(65) Prior Publication Data

US 2009/0260781 A1    Oct. 22, 2009

(51) Int. Cl.  
*F24F 3/16* (2006.01)

(52) U.S. Cl. .................. 62/78; 62/79; 62/530

(58) Field of Classification Search ............. 62/78, 62/79, 430, 434, 457.2, 530, 238.7; 165/104.21, 165/164, 176  
See application file for complete search history.

(56) References Cited

U.S. PATENT DOCUMENTS

| | | | |
|---|---|---|---|
| 4,281,969 A * | 8/1981 | Doub, Jr. ................. | 417/52 |
| 4,402,188 A * | 9/1983 | Skala ....................... | 62/56 |
| 5,598,720 A * | 2/1997 | MacCracken et al. ......... | 62/434 |
| 6,253,567 B1 * | 7/2001 | Imanari et al. ............ | 62/434 |
| 6,915,649 B2 * | 7/2005 | Amaral et al. ............. | 62/244 |
| 6,996,988 B1 * | 2/2006 | Bussard .................... | 60/641.8 |
| 7,106,777 B2 | 9/2006 | Delgado, Jr. et al. | |
| 7,124,594 B2 * | 10/2006 | McRell ..................... | 62/59 |

* cited by examiner

*Primary Examiner*—Mohammad M Ali  
(74) *Attorney, Agent, or Firm*—Haynes & Boone, LLP.

(57) ABSTRACT

A thermal buffer for an intermittent thermal load, e.g., a directed energy weapon (DEW) system, includes a phase change heat exchanger (PCHEX), an apparatus for circulating a first working fluid of the thermal load through first conduits of the PCHEX cell in a first direction such that heat is transferred between the first fluid and a phase change material (PCM) of the PCHEX in a second direction and causes a first phase change in the PCM, and an apparatus for circulating a second working fluid of, e.g., a heat pump through second conduits of the PCHEX in a third direction opposite to the first direction such that heat is transferred between the second fluid and the PCM in a fourth direction opposite to the second direction and results in a second phase change in the PCM opposite to the first phase change therein.

21 Claims, 3 Drawing Sheets

THERMAL BUFFER SYSTEM

BACKGROUND

The present disclosure relates to heating and cooling apparatus in general, and in particular, to a system that provides a heating or cooling "buffer" between a relatively continuous source of cooling or heating and an intermittent load (a user) of the heating or cooling.

Certain aircraft payloads, including directed energy weapons (DEWs), e.g., laser weapons, require substantial cooling at the lowest possible weight for sustained operation. This operation typically consists of relatively brief operating intervals, wherein relatively large "bursts" of cooling are required, interspersed with relatively long intervals in which the weapon is quiescent, and therefore, requires little or no cooling.

In one effort to address such cooling demands, so-called "Phase Change Heat Exchangers"PCHEXs) have been developed, such as are described in U.S. Pat. No. 7,106,777 to A. Delgado, Jr. et al., incorporated herein by reference, which enable the storage of cooling capacity in the form of solidified Phase Change Materials (PCMs). FIG. 1 is a functional block diagram of an existing PCHEX-cooled DEW system 100 that includes a Chemical Oxygen Iodine Laser (COIL) 102, shown to the right of the dashed line 101. In this DEW system, two fluids A and B, are supplied to a singlet oxygen generator 104, where they react to form an excited oxygen in a metastable state. The excited oxygen is fed from the generator into a laser nozzle 106, where it is reacted with two additional fluids C and D to effect lasing in a resonant cavity of the laser 102 and thereby produce a high energy beam of laser light 108 from the laser. Depleted laser fluids 110 are exhausted through a diffuser of the laser, and an un-reacted portion of the fluid A, which is heated by the reaction in the oxygen generator 104 and thus acts as a coolant fluid, is recirculated through a conditioner 112 and a PCHEX 114 for thermal conditioning, i.e., cooling. The cooled, reconditioned fluid A is then returned to the oxygen generator 104.

The PCHEX 114 of the system shown to the left of the dashed line 101 includes conduits 116 that pass through a "foam" matrix, e.g., an expanded metal or ceramic matrix, having a PCM material, e.g., a paraffin wax, water/ice or eutectic solutions, disposed in the interstices thereof. When the heated reaction fluid A passes through the conduits, heat is transferred from the fluid to the PCM, thereby cooling the fluid and causing the PCM to melt, i.e., to change phase, at a relatively constant temperature. When substantially all of the PCM is melted, the cooling capacity of the PCHEX is deemed to be exhausted, and the PCM must then be cooled, e.g., by refrigerating the PCHEX, to a temperature below the PCM's melting point and causing the PCM to solidify before the PCHEX can be reused. Cooling to the PCHEX 114 is provided through same conduits 116 used for cooling of reaction fluid A.

The existing DEW heating/cooling solutions thus include:

1) Conventional refrigeration systems (e.g., Freon compression/expansion systems) that cool the system using electricity as the power source;

2) "Phase change" approaches, such as that described above and illustrated in FIG. 1, which use a PCM material, such as ice, that melts to provide cooling, and in which the PCM is regenerated "offline"; and, 3) Multiple PCHEX units that are used sequentially, which effect the discharging of one unit while one or more additional exhausted units are being charged for re-use.

The foregoing approaches are all relatively heavy and/or do not provide optimal operational flexibility. For example, the existing PCHEX system described above charges and discharges through the same passageways, which in general, not only lacks a desired flexibility, but also prevents the use of different fluids for the two services. The latter drawback is a relatively important one for laser weapons, wherein the major coolant use is for laser diodes, in which water is used almost exclusively as the cooling medium of choice, whereas, the formation of ice requires the use of a material (e.g., a glycol solution) for cooling of the PCHEX that will remain a liquid below the freezing point of water. Additionally, these devices operate in either a "charge" mode (i.e., freezing the PCM using an external refrigeration system) or a "discharge" mode (i.e., thawing the PCM to cool the circulating DEW coolant).

Thus, while such systems are capable of performing the necessary cooling task satisfactorily, a strong need nevertheless exists for a more efficient, more operationally flexible, lower weight, higher capacity cooling system that has the ability to charge and discharge simultaneously, so that the DEW can operate in relatively large intermittent bursts but remain ready for further use as the PCHEX or other thermal storage method is recharged.

SUMMARY

In accordance with the present disclosure, a novel thermal buffer cooling system is provided for an intermittent, high-demand cooling load that is more efficient, lower in weight and higher in capacity than existing heating/cooling systems, and that has the ability to charge and discharge simultaneously, so that the cooling load can operate in intermittent, high-demand bursts and still remain ready for further use as the PCHEX or other thermal storage method is recharged on a relatively continuous but low-level basis.

In one exemplary embodiment, a thermal buffer for an intermittent thermal load, e.g., a directed energy weapon (DEW) system, includes a phase change heat exchanger (PCHEX), an apparatus for circulating a first working fluid of the thermal load through first conduits of the PCHEX cell in a first direction, such that heat is transferred between the first fluid and a PCM of the PCHEX in a second direction and causes a first phase change in the PCM, and an apparatus for circulating a second working fluid of a heat pump through second conduits of the PCHEX in a third direction opposite to the first direction, such that heat is transferred between the second fluid and the PCM in a fourth direction opposite to the second direction and results in a second phase change in the PCM opposite to the first phase change therein.

In another exemplary embodiment, a phase change heat exchanger (PCHEX) cell for a thermal buffer system comprises a plurality of generally parallel first and second conduits extending through a sealed housing and arranged in an alternating manner. Each of the conduits has opposite inlet and outlet ends. The inlet ends of the first conduits are disposed at an opposite end of the housing from the inlet ends of the second conduits. First and second headers are respectively coupled to the respective inlet ends of the first and second conduits. Each header has a fluid inlet and is disposed at an opposite end of the housing from the other header. First and second collectors are respectively coupled to the respective outlet ends of the first and second conduits. Each collector has a fluid outlet and is disposed at an opposite end of the housing from the other header. A thermally conductive matrix is disposed within the housing and between the conduits. The matrix is thermally coupled to exterior walls of the conduits and defines a plurality of interstitial voids therein. A phase change material (PCM) is disposed within and substantially fills the interstitial voids of the matrix.

A better understanding of the above and many other features and advantages of the novel heating and cooling system of the present disclosure may be obtained from a consideration of the detailed description of some exemplary embodiments thereof below, particular if such consideration is made in conjunction with the appended drawings, wherein like reference numbers are used to refer to like elements in the respective figures thereof.

DETAILED DESCRIPTION

In accordance with the present disclosure, a thermal buffer PCHEX cooling system provides intermittent bursts of cooling (or heating) to a load repetitively while being re-charged relatively continuously with the heat or cooling that is delivered. These two functions can occur synchronously or asynchronously and without interfering with each other.

Figure 1:
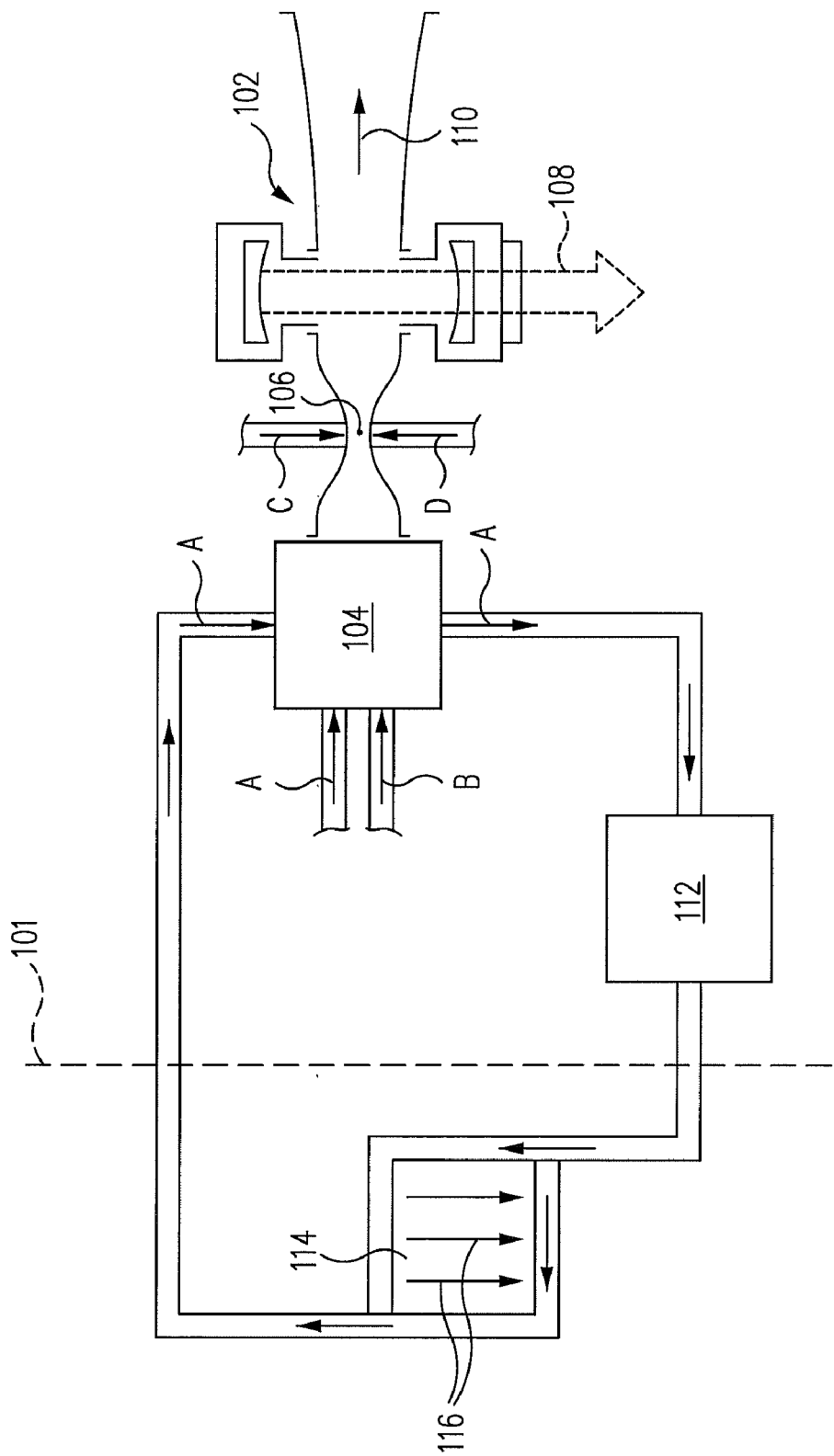
FIG. 1 is functional block diagram of a DEW system incorporating a conventional PCHEX cooling system.
Figure 2:
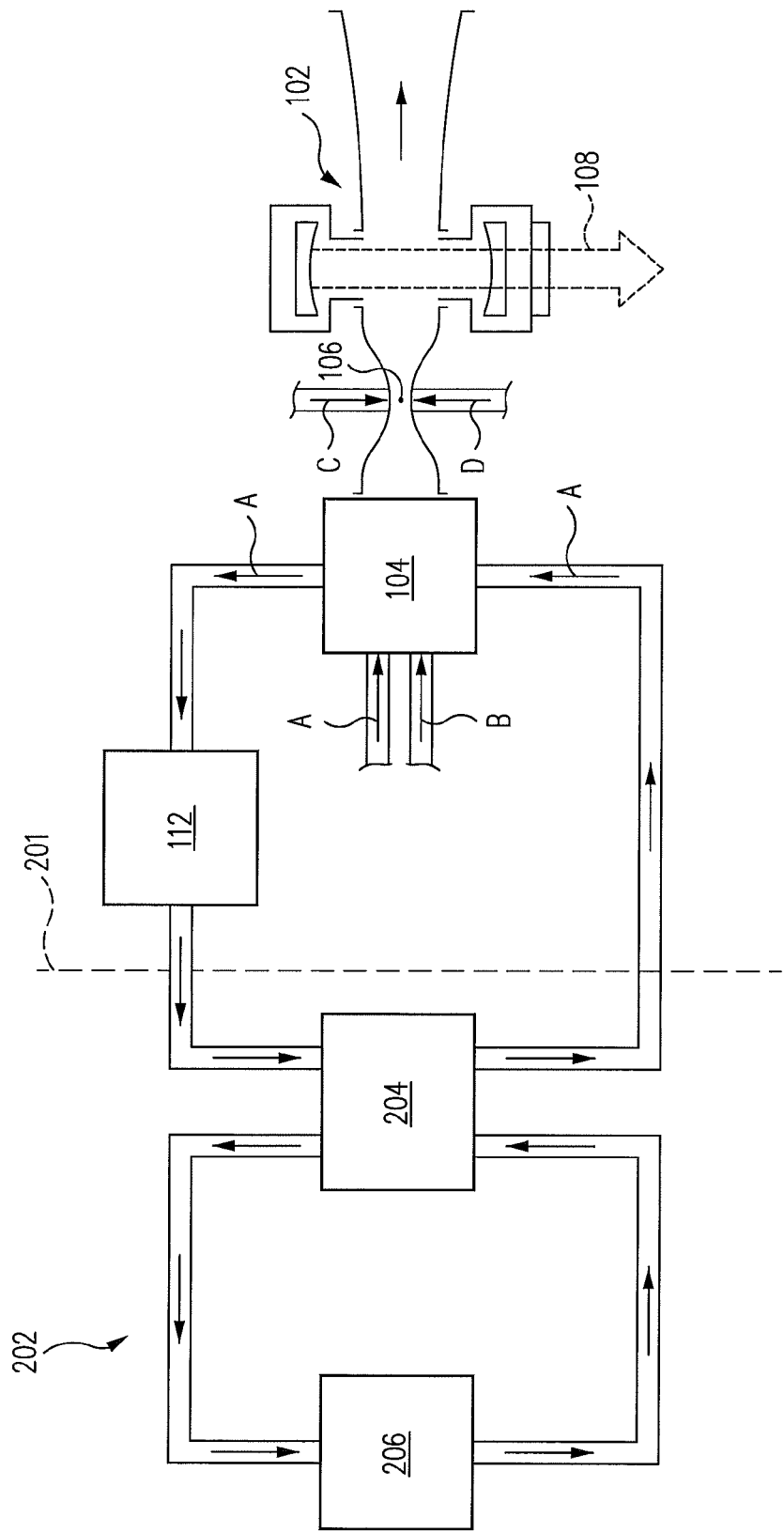
FIG. 2 is a functional block diagram of a DEW system incorporating an exemplary embodiment of a PCHEX thermal buffer cooling system in accordance with the present disclosure; and, FIG. 3 is a schematic cross-sectional view of an exemplary embodiment of a PCHEX of the exemplary thermal buffer system.
Figure 3:
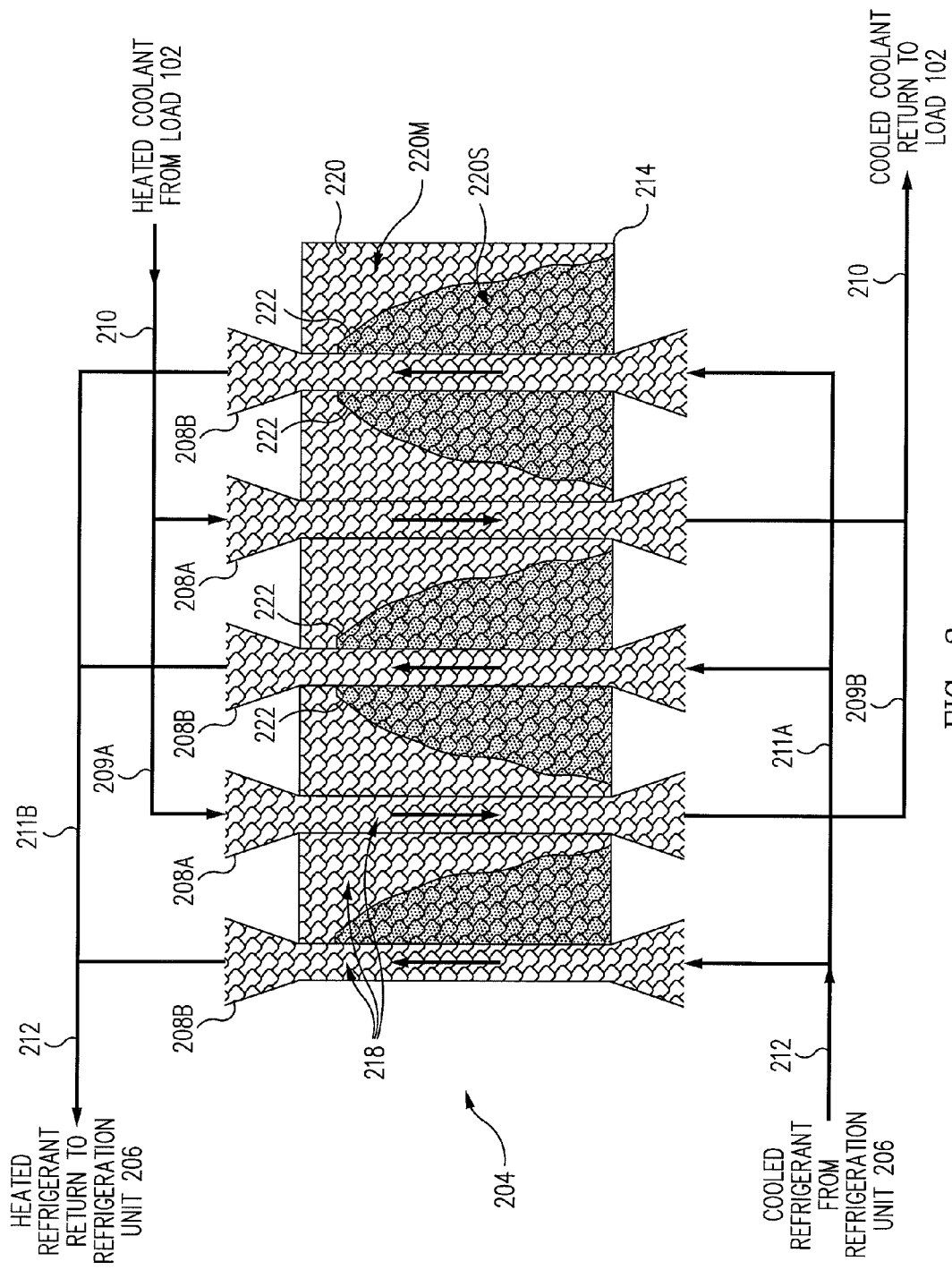

FIG. 2 is a functional block diagram of a DEW system 200 incorporating an exemplary embodiment of a PCHEX thermal buffer cooling system 202 in accordance with the present disclosure, and FIG. 3 is a schematic cross-sectional view of an exemplary embodiment of a PCHEX 204 of the thermal buffer system 202. As may be seen by reference to FIG. 2, the portion of the DEW system to the right of the dashed line 201 comprises a COIL laser 102 and associated singlet oxygen generator 104 substantially similar to that described above and illustrated in FIG. 1. However, it should be understood that the novel thermal buffer PCHEX system 200 of the present disclosure is not limited to such COIL DEW systems, but can be advantageously employed in other types of DEW systems, e.g., laser diode-driven DEWs, or indeed, in any thermodynamic system in which intermittent heating or cooling "burst" demands need to be met.

The thermal buffer system 202 shown to the left of the dashed line 201 of FIG. 2 comprises a PCHEX heat exchanger 204 described in more detail below, coupled to a conventional refrigeration unit, heating unit or a combination, reversible heating and cooling unit often referred to as a "heat pump" 206. FIG. 3 is a schematic cross-sectional view of the exemplary PCHEX 204 of the system.

With reference to FIG. 3, the exemplary PCHEX 204 comprises a plurality of "counter flow" fluid conduits 208A and 208B, through which a first coolant fluid 210 from a load, e.g., the DEW 102 of FIG. 2, and a second refrigerant fluid 212 from, e.g., the refrigerating unit 206 of FIG. 2, respectively flow. The respective coolant and refrigeration fluids 210 and 212 may comprise a gas, liquid or a two-phase mixture of gas and liquid. The conduits 208A and 208B are disposed in a closed housing 214 and respectively equipped with headers and collectors 209A, 209B and 211A, 211B at the respective opposite ends thereof. This separate header, collector and conduit arrangement enables the respective coolant and refrigerant "working" fluids 210 and 212 to flow in opposite directions through the PCHEX simultaneously and without intermingling with each other or the other internal components of the PCHEX described below.

The exemplary PCHEX 204 "cell" of FIG. 3 may include additional conduits 208A and 208B disposed on either side of those illustrated in the figure, preferably arranged in an alternating manner, and further, may include additional conduits that extend in a direction perpendicular to the common plane of those illustrated in FIG. 3, which are also arranged in an alternating manner, and these may be disposed in either an in-line or a staggered arrangement relative to those of the figure. Additionally, as those of skill in the art will appreciate, multiple PCHEX "cells" such as that illustrated in FIG. 3 can be stacked in series on top of each other to provide additional cooling or heating capacity. Generally speaking, two identical stacked PCHEX cells 204 will provide about twice the cooling or heating rate and energy storage capacity of a single cell.

In the particular exemplary embodiment of FIG. 3, substantially the entire internal volume of the PCHEX 202 external to the walls of the fluid conduits 208A and 208B is occupied by an expanded foam matrix 218, which may comprise an expanded metal or ceramic, coupled to the external walls of the conduits and having interstices within which a suitable PCM 220 of a type described in more detail below is disposed. The interior walls of the fluid conduits may also have an expanded foam matrix disposed thereon, or alternatively, may incorporate a plurality of raised fins (not illustrated), both of which are adapted to transfer heat between the respective working fluids 210 and 212 and the PCM in a more efficient manner than conduits having bare walls.

In operation, heated coolant fluid 210 from a load, e.g., the DEW laser 102 of FIG. 2, flows through the alternating coolant fluid conduits 208A in a first direction, indicated by the broad arrows of FIG. 3, causing heat to be transferred from the fluid to the PCM 220, thereby cooling the coolant fluid and causing a solid portion of the PCM to melt into a liquid portion 220M, as indicated by the lighter areas of FIG. 3. Conversely, cooled refrigerant fluid 212 from the refrigerating unit 204 flows through the alternating refrigerant fluid conduits 208B in a second direction opposite to the first, as indicated by the oppositely pointing broad arrows of FIG. 3, causing heat to be transferred from the PCM, thereby warming the refrigerant fluid and causing a liquid portion of the PCM to solidify to a solid portion 220S, as indicated by the dark areas of FIG. 3.

In the following description of the exemplary PCHEX 204 cell, it is assumed that cooling is provided to the end user (e.g., the DEW laser 102 of FIG. 2) from a PCM 220 that expands on freezing (e.g., water-to-ice). The provision of separate passageways 208A and 208B in the PCHEX, both of which are in a relatively "close" thermal contact with the PCM due to the conductive matrix 218, permits simultaneous thermal conditioning and thermal management. Since the thermal buffer system 202 is completely reversible in operation, the same system, equipped with a conventional heat pump, may be used for providing either heating or cooling, and one that can use a PCM that either expands or shrinks on cooling, requiring only the interchange of the direction of flow of the two working fluids 210 and 212 in the PCHEX, as appropriate to the particular situation. The rule for determining the flow direction of the fluids within the PCHEX is that a phase change of the PCM 220 that results in an expansion of its volume must occur with liquid disposed above it to prevent overpressure during the phase change process.

The PCHEX 204 of the thermal buffer system 202 thus may provide multiple layers or cells of a PCM 220 and thermally conductive foam 218 arranged between streams of the coolant fluid 210 for the DEW laser 120 and a refrigerant fluid 212 coming from a primary refrigerator unit 206 (e.g., a conventional refrigerator using Freon, or a functional equivalent, as a working fluid). In the particular embodiment of FIG. 3, the DEW coolant fluid 210 enters at the top of the PCHEX at a temperature above the phase transition temperature of the PCM, and is cooled as it passes therethrough. As illustrated in FIG. 3, a solid/liquid boundary 222 is defined in the PCM, which is farthest from the DEW coolant 210 at the top, where the heated fluid enters and is the hottest, and is closest to the DEW coolant temperature at the bottom of the PCHEX, from whence the coolant returns to the load 102. The expanded foam 218 in the PCM provides the needed heat transfer capability within the PCM layer. As above, thermally conductive foam, fins or other types of extended surfaces may be used in the coolant and refrigerant layers as desired.

At the same time that the coolant fluid 210 is being cooled, the refrigerant fluid 212 (e.g., glycol, brine or Freon) enters the PCHEX 204 from the bottom and on the opposite side of each layer or cell of PCM 220 from the coolant fluid 210, and at a temperature below that of the phase transition temperature of the PCM 220. This flow removes heat from the PCM layer through the foam structure in that layer and causes the PCM to return to the solid form.

As an example, in one possible system, a DEW laser 120 may require 500 kW of cooling in bursts of up to 90 seconds each, while operating on the average only 5% of the time, i.e., a 5% "duty factor" (DF). Under these circumstances, the PCM 220 may be sized to provide in excess of 500 kW×90 sec=45 MJ of cooling capacity.

If the PCM 220 consists of ice ($\Delta H_{fusion}$=333.5 kJ/kg), this requires only 45 MJ/0.333.5 MJ/kg≈135 kg.

of ice to provide the required burst thermal capacity. Experience has shown that the weight of the PCHEX 204 can be approximately equal to that of the PCM 220 contained therein, giving a filled PCHEX weight of about 270 kg.

The exemplary 5% duty factor will require only 500 kW×5% DF=25 ≈kW 7 tons of refrigeration.

A practical 7 ton refrigerator for an aerospace application may weigh about 100 kg, and may require about 8 kW of electricity to operate, these values being dependent on the ambient temperature. This results in a total weight of about 370 kg for the exemplary thermal buffer system 202 and requires an amount of power that is manageable on many airborne and space platforms from a practicable standpoint.

By contrast, the direct supply of 500 kW from a refrigerator unit would require approximately 140 tons of refrigeration, would weigh over 1000 kg, and would require 150 kW of electricity to operate. This is clearly a case of overdesign, and results in a system that is much heavier and more difficult to implement than is necessary. This would also require the refrigerator unit to rapidly change output rates in a short timeframe (i.e. a few seconds), which is typically outside of the capabilities of typical refrigeration units.

During the course of a typical eight-hour "on station" period, a typical DEW system 200 may operate for a total of 1440 seconds, which would require over 5,920 kg of ice and a conventional PCHEX 114 of the type illustrated in FIG. 1 that weighs over 12,000 kg. Thus, this extreme also produces a much higher total weight than is necessary, given the intermittent operation of the DEW system.

Thus, as those of skill in the art will appreciate, the exemplary thermal buffer system 202 of the present disclosure provides an optimal blending of existing technologies (i.e., a modified PCHEX 204 and conventional refrigeration unit 206) to provide power- and weight-efficient heating or cooling to a payload that requires large bursts of cooling on a relatively infrequent and random basis, so as to minimize system weight while maximizing operational flexibility. It is therefore both lighter and makes better use of power sources typically available on aircraft, thereby providing reduced system costs, greater capability, and the ability to use smaller platforms, or alternatively, provides greater payload capabilities within fixed constraints (e.g., weight, platform type).

As those of skill in this art will by now appreciate, many modifications, substitutions and variations can be made in the constructions and methods of implementation of the thermal buffer system of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. A phase change heat exchanger (PCHEX) cell for a thermal buffer, comprising:
   a plurality of generally parallel first and second conduits extending through a sealed housing and arranged in an alternating manner, each conduit having opposite inlet and outlet ends, the inlet ends of the first conduits being disposed at an opposite end of the housing from the inlet ends of the second conduits;
   first and second headers respectively coupled to the respective inlet ends of the first and second conduits, each header having a fluid inlet and being disposed at an opposite end of the housing from the other header;
   first and second collectors respectively coupled to the respective outlet ends of the first and second conduits, each collector having a fluid outlet and being disposed at an opposite end of the housing from the other header;
   a thermally conductive matrix disposed within the housing and between the conduits, the matrix being thermally coupled to exterior walls of the conduits and defining a plurality of interstitial voids therein; and,
   a phase change material (PCM) disposed within and substantially filling the interstitial voids of the matrix.

2. The PCHEX cell of claim 1, wherein the PCM comprises water, a paraffin wax or a eutectic solution.

3. The PCHEX cell of claim 1, wherein the thermally conductive matrix comprises a metal or a ceramic.

4. The PCHEX cell of claim 1, further comprising a thermally conductive matrix disposed within and thermally coupled to interior walls of at least some of the first and second conduits.

5. The PCHEX cell of claim 1, further comprising a plurality of thermally conductive fins coupled to interior walls of at least some of the first and second conduits.

6. A method for cooling an intermittent heat load using the PCHEX cell of claim 1, the method comprising:
   circulating a first working fluid of the heat load through the first conduits of the PCHEX cell in a first direction such that heat is transferred from the first fluid to the PCM of the PCHEX cell and causes a solid portion of the PCM to melt; and,
   circulating a second working fluid of a heat pump through the second conduits of the PCHEX cell in a second direction opposite to the first direction such that heat is transferred from the PCM to the second fluid and causes a liquid portion of the PCM to solidify.

7. A method for heating an intermittent cold load using the PCHEX cell of claim 1, the method comprising:
   circulating a first working fluid of the cold load through the first conduits of the PCHEX cell in a first direction such that heat is transferred from the PCM of the PCHEX cell to the first fluid and causes a liquid portion of the PCM to solidify; and,
   circulating a second working fluid of a heat pump through the second conduits of the PCHEX cell in a second direction opposite to the first direction such that heat is transferred from the PCM to the second fluid and causes a solid portion of the PCM to melt.

8. The method of claim 6, wherein the first working fluid enters the first conduits at a temperature greater than the melting temperature of the PCM and the second working fluid enters the second conduits at a temperature lower than the freezing temperature of the PCM.

9. The method of claim 7, wherein the first working fluid enters the first conduits at a temperature lower than the freezing temperature of the PCM and the second working fluid enters the second conduits at a temperature greater than the melting temperature of the PCM.

10. The method of claim 6, wherein the first working fluid comprises hydrogen peroxide or water and the second working fluid comprises brine, glycol, Freon or a functional equivalent of Freon.

11. A phase change heat exchanger (PCHEX) for a thermal buffer comprising a plurality of the PCHEX cells of claim 1 coupled to each other in series.

12. A thermal buffer system, comprising:
   a phase change heat exchanger (PCHEX) cell, comprising:
      a plurality of generally parallel first and second conduits extending through a sealed housing and arranged in an alternating manner, each conduit having opposite inlet and outlet ends, the inlet ends of the first conduits being disposed at an opposite end of the housing from the inlet ends of the second conduits;
      first and second headers respectively coupled to the respective inlet ends of the first and second conduits, each header having a fluid inlet and being disposed at an opposite end of the housing from the other header;
      first and second collectors respectively coupled to the respective outlet ends of the first and second conduits, each collector having a fluid outlet and being disposed at an opposite end of the housing from the other header;
      a thermally conductive matrix disposed within the housing and between the conduits, the matrix being thermally coupled to exterior walls of the conduits and defining a plurality of interstitial voids therein; and,
      a phase change material (PCM) disposed within and substantially filling the interstitial voids of the matrix.
   an apparatus for circulating a first working fluid of an intermittent thermal load through the first conduits of the PCHEX in a first direction such that heat is transferred between the first fluid and the PCM of the PCHEX in a second direction and causes a first phase change in the PCM; and,
   an apparatus for circulating a second working fluid of a heat pump through the second conduits of the PCHEX in a third direction opposite to the first direction such that heat is transferred between the second fluid and the PCM in a fourth direction opposite to the second direction and causes a second phase change in the PCM opposite to the first phase change therein.

13. The thermal buffer system of claim 12, wherein the intermittent thermal load comprises a heat load and the heat pump consists of a refrigeration unit.

14. The thermal buffer system of claim 12, wherein the intermittent thermal load comprises a cold load and the heat pump consists of a heating unit.

15. The thermal buffer system of claim 13, wherein the first working fluid enters the first conduits at a temperature greater than the melting temperature of the PCM and the second working fluid enters the second conduits at a temperature lower than the freezing temperature of the PCM.

16. The thermal buffer system of claim 14, wherein the first working fluid enters the first conduits at a temperature lower than the freezing temperature of the PCM and the second working fluid enters the second conduits at a temperature greater than the melting temperature of the PCM.

17. The thermal buffer system of claim 12, wherein the system comprises a plurality of the PCHEX cells coupled to each other in series.

18. The thermal buffer system of claim 12, wherein the intermittent load comprises a directed energy weapon (DEW).

19. The thermal buffer system of claim 18, wherein the DEW comprises laser diodes or a Chemical Oxygen Iodine Laser (COIL).

20. The thermal buffer system of claim 18, wherein the DEW and buffer system are disposed aboard an aircraft.

21. A method for heating or cooling an intermittent thermal load, the method comprising:
   circulating a first working fluid of the load through a first conduit of a phase change heat exchanger (PCHEX) in a first direction such that heat is transferred between the first fluid and a phase change material (PCM) of the PCHEX in a second direction and causes a first phase change in the PCM; and,
   circulating a second working fluid of a heat pump through a second conduit of the PCHEX in a third direction opposite to the first direction such that heat is transferred between the second fluid and the PCM in a fourth direction opposite to the second direction and causes a second phase change in the PCM opposite to the first phase change therein.

* * * * *